(12) United States Patent
Kitao

(10) Patent No.: US 6,831,656 B2
(45) Date of Patent: Dec. 14, 2004

(54) GAME SYSTEM AND COMPUTER READABLE STORAGE MEDIUM STORING GAME PROGRAM

(75) Inventor: Takashi Kitao, Tokyo (JP)

(73) Assignee: Konami Computer Entertainment Japan, Inc., Tokyo (JP)

( * ) Notice: Subject to any disclaimer, the term of this patent is extended or adjusted under 35 U.S.C. 154(b) by 208 days.

(21) Appl. No.: 09/815,572

(22) Filed: Mar. 23, 2001

(65) Prior Publication Data

US 2001/0030652 A1 Oct. 18, 2001

(30) Foreign Application Priority Data

Mar. 24, 2000 (JP) .......................................... 2000-88604

(51) Int. Cl.$^7$ ................................................ G09G 5/00
(52) U.S. Cl. ...................... 345/582; 345/419; 345/426; 345/428; 345/583
(58) Field of Search ................................ 345/426, 582, 345/419, 583, 428

(56) References Cited

U.S. PATENT DOCUMENTS

| | | | |
|---|---|---|---|
| 4,727,365 A | | 2/1988 | Bunker et al. |
| 5,699,497 A | * | 12/1997 | Erdahl et al. ................ 345/428 |
| 5,742,749 A | * | 4/1998 | Foran et al. .................. 345/426 |
| 5,786,822 A | * | 7/1998 | Sakaibara et al. ........... 345/582 |
| 6,256,040 B1 | * | 7/2001 | Tanaka et al. ............... 345/421 |
| 6,268,861 B1 | * | 7/2001 | Sanz-Pastor et al. ........ 345/426 |
| 6,348,924 B1 | * | 2/2002 | Brinsmead .................... 345/441 |

FOREIGN PATENT DOCUMENTS

EP 0 782 104 7/1997

OTHER PUBLICATIONS

Manuel M. Oliveira, Gary Bishop, David McAllister "Factoring 3–D Image Warping Equations into a Pre–Warp Followed by Conventional Texture Mapping", UNC Computer Science Technical Report, pp. 1–9, Jan. 15, 1999.

Manuel M. Oliveira, Gary Bishop "Releif Textures", UNC Computer Science Technical Report, pp. 1–25, Mar. 29, 1999.

* cited by examiner

*Primary Examiner*—Matthew C. Bella
*Assistant Examiner*—Po-Wei Chen (57) ABSTRACT

A game system in which a game field is configured in a virtual three-dimensional space and a display image of said game field visible from a predetermined viewpoint is formed to thereby be displayed as a game picture. The system comprises a texture storing device for storing in advance a texture representing a three-dimensional configuration as a two-dimensional pattern, a mapping surface setting device for setting a mapping surface of the texture in the game field, a texture processing device for processing the texture readout from the texture storing device in accordance with a dispositional relationship between the viewpoint and the mapping surface, and a texture mapping device for mapping the processed texture on the mapping surface.

8 Claims, 11 Drawing Sheets

GAME SYSTEM AND COMPUTER READABLE STORAGE MEDIUM STORING GAME PROGRAM

FIELD OF THE INVENTION

The present invention belongs to a technical field of a game system in which an image is formed through a texture mapping process in a game field constructed in a virtual three-dimensional space and is displayed as a game picture.

DESCRIPTION OF THE RELATED ART

Recently, a three-dimensional game becomes popular in which three-dimensional display processing of a game picture is executed as a processing capability of a game apparatus improves. In such three-dimensional games, an object disposed in the virtual three-dimensional space is subject to the three-dimensionally modeling and is divided into a lot of polygons, and a texture having a pattern corresponding to each polygon is mapped on the polygon to thereby form a display image. Therefore, a player enjoying the game is allowed to watch a real game picture in which he or she can freely move in the three-dimensional space.

In the above described three-dimensional game, it is necessary to increase the number of polygons required to perform the three-dimensionally modeling of each object in order to display a high quality and real picture. However, a load in the image processing may excessively be increased with the number of the polygons increasing. Accordingly, it is inevitable to restrict the number of polygons to be used within a certain range for making the game picture in view of the load in the image processing.

On the other hand, to prevent the increase of the number of polygons, it is possible to represent an image by using a texture representing a two-dimensional pattern without dividing the model into polygons, when representing a three-dimensional configuration such as a bumpy configuration. According to such an image representation method, there is no problem when a viewpoint is fixed at a certain position in the game field. However, since the texture can not be varied in accordance with changes of the viewpoint, it is difficult to obtain solidity or plasticity when the two-dimensional pattern on the texture is observed from the viewpoint capable of moving in the game field. Therefore, there is a problem that the real three-dimensional picture can not be displayed, so that the player may feel that something is wrong.

SUMMARY OF THE INVENTION

Therefore, it is an object of the present invention to provide a game system capable of displaying a real and high grade three-dimensional picture for a player without increasing the load of image processing when displaying a game field constructed in a virtual three-dimensional space as a game picture.

To solve the above problem, there is provided a game system in which a game field is configured in a virtual three-dimensional space and a display image of said game field visible from a predetermined viewpoint is formed to thereby be displayed as a game picture, comprising: a texture storing device for storing in advance a texture representing a three-dimensional configuration as a two-dimensional pattern; a mapping surface setting device for setting a mapping surface of the texture in the game field; a texture processing device for processing the texture readout from the texture storing device in accordance with a dispositional relationship between the viewpoint and the mapping surface; and a texture mapping device for mapping the processed texture on the mapping surface.

According to the above game system, the texture rendered thereon a display object having a three-dimensional configuration as a two-dimensional pattern is prepared in advance, and the texture is mapped on the mapping surface after being processed corresponding to a view of the display object from the viewpoint. Therefore, when the viewpoint moves in the game field, the two-dimensional pattern can be stereoscopically observed in accordance with changes of the viewpoint without carrying out the modeling of the three-dimensional configuration. Thus, it is possible to display a high grade game picture having solidity or plasticity without excessively increasing the load of the image processing.

In the above game system, the texture processing device may deform a configuration of the texture readout from the texture storing device in accordance with the dispositional relationship between the viewpoint and the mapping surface.

According to this case, the texture is mapped on the mapping surface after being deformed to accord with the view of the display object from the viewpoint when processing the texture. Therefore, it is possible to display a game picture which represents a pseudo-solidity with using a two-dimensional pattern owing to a deformation effect of the texture when the viewpoint moves in the game field.

The texture processing device may extract a part from the texture readout from the texture storing device in accordance with the dispositional relationship between the viewpoint and the mapping surface.

According to this case, the texture partially extracted is mapped on the mapping surface to accord with the view of the display object from the viewpoint when processing the texture. Therefore, it is possible to eliminate a portion not to be observed from the texture in accordance with the viewpoint when it moves in the game field. Thus, a three-dimensional configuration can be reflected in the game picture with using a two-dimensional pattern.

The texture processing device may deform a configuration of the texture readout from the texture storing device, and then may extract a part from the deformed texture in accordance with the dispositional relationship between the viewpoint and the mapping surface.

According to this case, a partial texture extracted from an original texture is mapped on the mapping surface after deforming the original texture to accord with the view of the display object from the viewpoint when processing the texture. Therefore, it is possible to delicately render a complex three-dimensional configuration with using a two-dimensional pattern.

The texture processing device may define an extraction position for extracting said part from the texture depending on an oblique angle of the mapping surface observed from the viewpoint, and may extract said part from the texture readout from the texture storing device in accordance with the extraction position.

According to this case, the texture is extracted at the extracting position depending on the oblique angle of the mapping surface viewed from the viewpoint, when processing the texture. Therefore, even though the angle of view to the display object changes according to the movement of the viewpoint, it is possible to change the view of the three-dimensional configuration in accordance with that angle.

The texture processing device may determine an area to be treated as a dead space in the texture depending on the oblique angle, and may define the extraction position so as to eliminate the area to be treated as the dead space from the texture.

According to this case, the extraction of the texture is carried out to eliminate the dead space in the original texture not to be observed from the viewpoint when processing the texture. Therefore, even though the texture can not partially be observed depending on the viewpoint when the viewpoint moves in the game field, this situation can exactly be displayed in the game picture.

The texture storing device may store in advance a texture on which a surface formed with a recess portion is rendered as a two-dimensional pattern, and the texture processing device may define, as the extraction position, a line shifting on the texture in connection with the oblique angle.

According to this case, when processing the texture, the extraction of the texture is carried out to eliminate, from the recess portion formed on the wall surface or the like, a part to be a dead space when the recess portion is viewed from an oblique angle. Therefore, it is possible to exactly display only a part of the recess portion formed on the wall surface or the like in accordance with the viewpoint when it moves in the game field.

In another aspect of the present invention, there is provided a game system in which a game field is configured in a virtual three-dimensional space and a display image of said game field visible from a predetermined viewpoint is formed to thereby be displayed as a game picture, comprising: a texture storing device for storing in advance a plurality of textures, each of which represents a three-dimensional configuration as a two-dimensional pattern; a surface of the texture in the game field; a texture processing device for processing the textures readout from the texture storing device in accordance with a dispositional relationship between the viewpoint and the mapping surface, respectively; a texture joining device for joining the processed textures to each other at a predetermined joint position corresponding to the dispositional relationship between the viewpoint and the mapping surface; and a texture mapping device for mapping the joined texture on the mapping surface.

According to the above game system, when displaying a game picture of a three-dimensional game, a plurality of textures are prepared in advance, and the respective textures are processed as mentioned above. Then, the textures are mapped on the mapping surface after being joined at a predetermined joining position to each other. Therefore, it is possible to represent a complex three-dimensional configuration by aggregating and merging two-dimensional patterns, thereby enabling display of a game picture through which latitude of stereoscopic expression is extended without using a three-dimensional modeling.

In the above game system, a parameter indicating transparency may be set for each area provided on each of the textures, and, according to the dispositional relationship between the viewpoint and the mapping surface, the texture processing device may change the parameter indicating the transparency for each area on each texture readout from the texture storing device.

According to this case, the textures rendered thereon two-dimensional patterns and transparency for each area is set as a parameter are prepared in advance, and each texture is mapped on the mapping surface after changing the parameter indicating the transparency to accord with the view of the display object from the viewpoint. Therefore, it is possible to exactly display an object having the transparency variable in accordance with an observation direction when the viewpoint moves in the game field.

The game system of the present invention may further comprise a mask pattern disposal device for disposing a mask pattern to mask an image area which is not displayed in the game picture in the texture or each of the textures.

According to this case, an area in the texture except an image area as a display object is masked by using the mask pattern when mapping the texture on the mapping surface. Therefore, regardless of the configuration of the texture itself, an appropriate display can be carried out by forming a mask opening along with the image area with respect to the mask pattern, thereby allowing the game system to obtain the above described effects with using simplified image processing.

In a further aspect of the present invention, there is provided a computer readable storage medium storing a game program for allowing a computer included in a game system in which a game field is configured in a virtual three-dimensional space and a display image of said game field visible from a predetermined viewpoint is formed to thereby be displayed as a game picture, to serve as: a texture storing device for storing in advance a texture representing a three-dimensional configuration as a two-dimensional pattern; a mapping surface setting device for setting a mapping surface of the texture in the game field; a texture processing device for processing the texture readout from the texture storing device in accordance with a dispositional relationship between the viewpoint and the mapping surface; and a texture mapping device for mapping the processed texture on the mapping surface.

In the above described computer readable storage medium, the texture processing device may deform a configuration of the texture readout from the texture storing device in accordance with the dispositional relationship between the viewpoint and the mapping surface.

The texture processing device may extract a part from the texture readout from the texture storing device in accordance with the dispositional relationship between the viewpoint and the mapping surface.

The texture processing device may deform a configuration of the texture readout from the texture storing device, and then may extract a part from the deformed texture in accordance with the dispositional relationship between the viewpoint and the mapping surface.

The texture processing device may define an extraction position for extracting said part from the texture depending on an oblique angle of the mapping surface observed from the viewpoint, and may extract said part from the texture readout from the texture storing device in accordance with the extraction position.

The texture processing device may determine an area to be treated as a dead space in the texture depending on the oblique angle, and may define the extraction position so as to eliminate the area to be treated as the dead space from the texture.

The texture storing device may store in advance a texture on which a surface formed with a recess portion is rendered as a two-dimensional pattern, and the texture processing device may define, as the extraction position, a line shifting on the texture in connection with the oblique angle.

In a still further aspect of the present invention, there is provided a computer readable storage medium storing a game program for allowing a computer included in a game system in which a game field is configured in a virtual three-dimensional space and a display image of said game field visible from a predetermined viewpoint is formed to thereby be displayed as a game picture, to serve as: a texture storing device for storing in advance a plurality of textures, each of which represents a three-dimensional configuration as a two-dimensional pattern; a mapping surface setting device for setting a mapping surface of the texture in the game field; a texture processing device for processing the textures readout from the texture storing device in accordance with a dispositional relationship between the viewpoint and the mapping surface, respectively; a texture joining device for joining the processed textures to each other at a predetermined joint position corresponding to the dispositional relationship between the viewpoint and the mapping surface; and a texture mapping device for mapping the joined texture on the mapping surface.

In this computer readable storage medium, a parameter indicating transparency may be set for each area provided on each of the textures, and, according to the dispositional relationship between the viewpoint and the mapping surface, the texture processing device may change the parameter indicating the transparency for each area on each texture readout from the texture storing device.

The game program may further allow the computer to serve as a mask pattern disposal device for disposing a mask pattern to mask an image area which is not displayed in the game picture in the texture.

DETAILED DESCRIPTION OF THE PREFERRED EMBODIMENT

Preferred embodiments of the present invention will now be described in detail with reference to the drawings.

Figure 1:
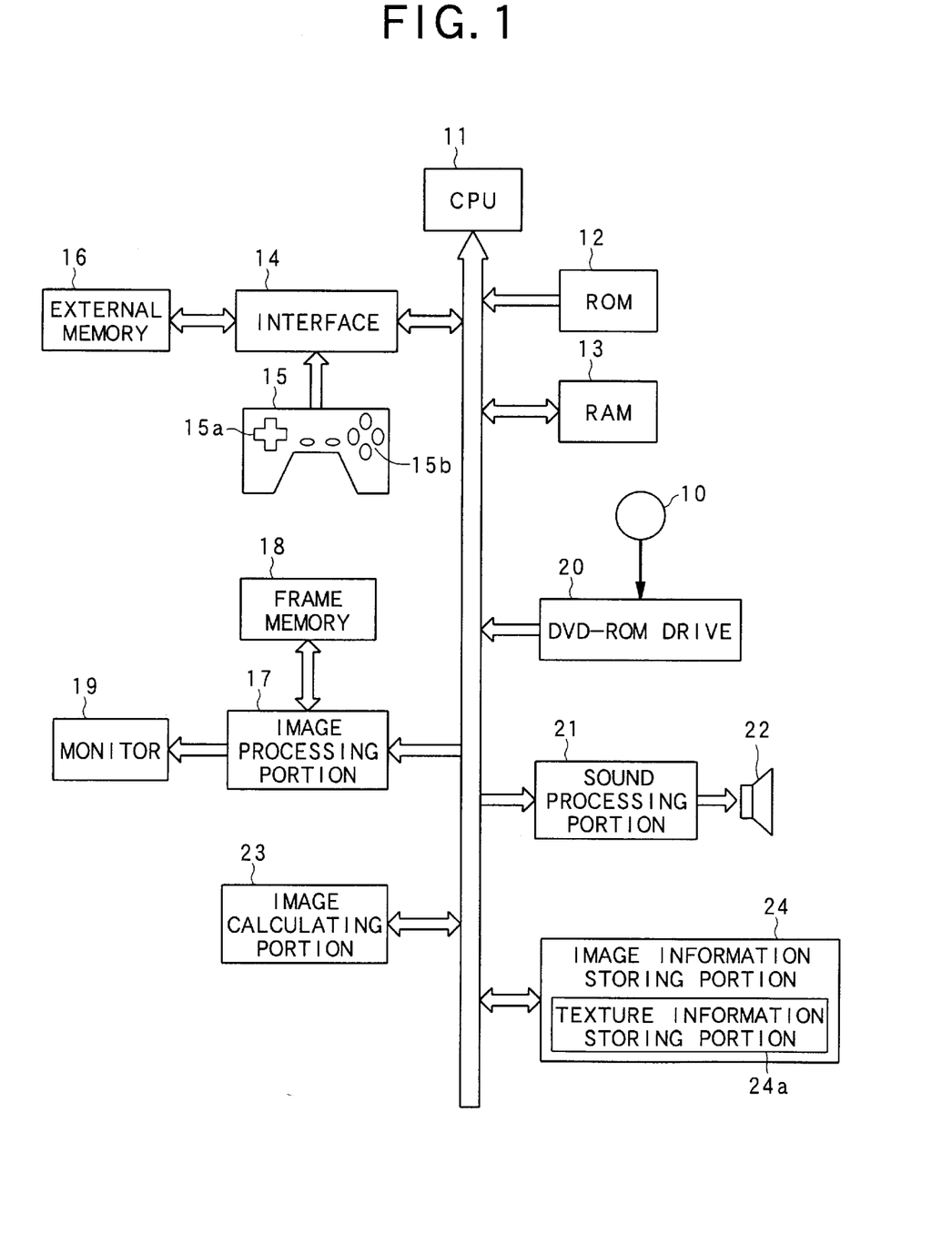
FIG. 1 is a block diagram showing a schematic structure of the game system according to the preferred embodiment of the present invention.

FIG. 1 is a diagram showing a schematic structure of the game system according to the embodiment of the present invention. A game system showing in FIG. 1 is equipped with a CPU 11, a ROM 12, a RAM 13, an interface 14, a controller 15, an external memory 16, an image processing portion 17, a frame memory 18, a monitor 19, a DVD-ROM drive 20, a sound processing portion 21, a loudspeaker 22, an image calculating portion 23, and an image information storing portion 24, and can execute a predetermined game with a DVD-ROM 10 storing a game program and data being mounted.

In FIG. 1, the CPU 11 controls action of the entire game system and exchanges control signals and data with being connected each component. The ROM 12 and RAM 13 are used as memory means, and there are stored in the ROM 12 a program of an operating system and various data each necessary for controlling the action of the entire game system. Also, there is provided in the RAM 13 a memory area for temporary storing a game program and data readout from the DVD-ROM 10 or data and so on necessary for advancing the game.

The controller 15 connected through the interface 14 serves as operation means to which the player performs operation when the game is executed. The controller 15 is provided with operation members such as a cross-shaped key 15a and push button switches 15b, and signals are issued to the CPU 11 in response to the operation state of these operation members. Also, the external memory 16 detachably connected through the interface 14 is used for storing data indicating the progress state of the game or the like. During the game play, predetermined data can be stored in the external memory 16 in accordance with the instruction from the player issued by using the controller 15, if necessary.

The DVD-ROM 10 is a storage medium storing various types of data accompanying the program and the data for executing the game, such as image data, sound date and so on. The DVD-ROM drive 20 performs a reading action to thereby read necessary program and data.

The image processing portion 17 performs image processing to the image data which has been subjected to the calculation processing by the image calculation portion 23 after processed by the CPU 11. The frame memory 18 stores image data corresponding to a game picture for each frame drawn by the image processing portion 17. The image data readout from the frame memory 18 at a predetermined timing under the control of the CPU 11 is converted into a video signal and that signal is output to the monitor 19.

The sound processing portion 21 converts sound data readout from the DVD-ROM 10 into analog sound signals and those signals are output from the loudspeaker 22. Also, under the control of the CPU 11, the sound processing portion 21 generates data of sound effects or musical sounds required in the game, and converts those data into analog signals to be output from the loudspeaker 22.

Generally, a television set and a loudspeaker attached thereto are used as the monitor 19 and the loud speaker 22, respectively.

The image calculating portion 23 performs image calculation processing necessary for constructing a virtual three-dimensional space. The image calculating portion 23 executes, for example, a calculation of coordinate transformation to an object disposed in the virtual three-dimensional, a calculation of lighting processing, a calculation necessary for an after-mentioned texture processing or texture mapping processing.

The image information storing portion 24 stores various image information necessary for image calculation processing by the image calculation portion 23. For example, there are stored in the image information storing portion 24 vertex coordinate information of polygons forming each object, texture information, lighting information, color information and so on. Then, the image information storing portion 24 includes a texture information storing portion 24a, and texture information to be subjected to the after-mentioned texture processing is stored therein.

Next, image processing performed in the game system of this embodiment will be described with referring to FIGS. 2 to 12. Hereinafter, the explanation is focused on an example of a game in which an object in a game field as a three-dimensional space is movably operated toward a desired direction in response to an operation of a player, and a view image observed from an arbitrary viewpoint is displayed in a game picture.

Figure 2:
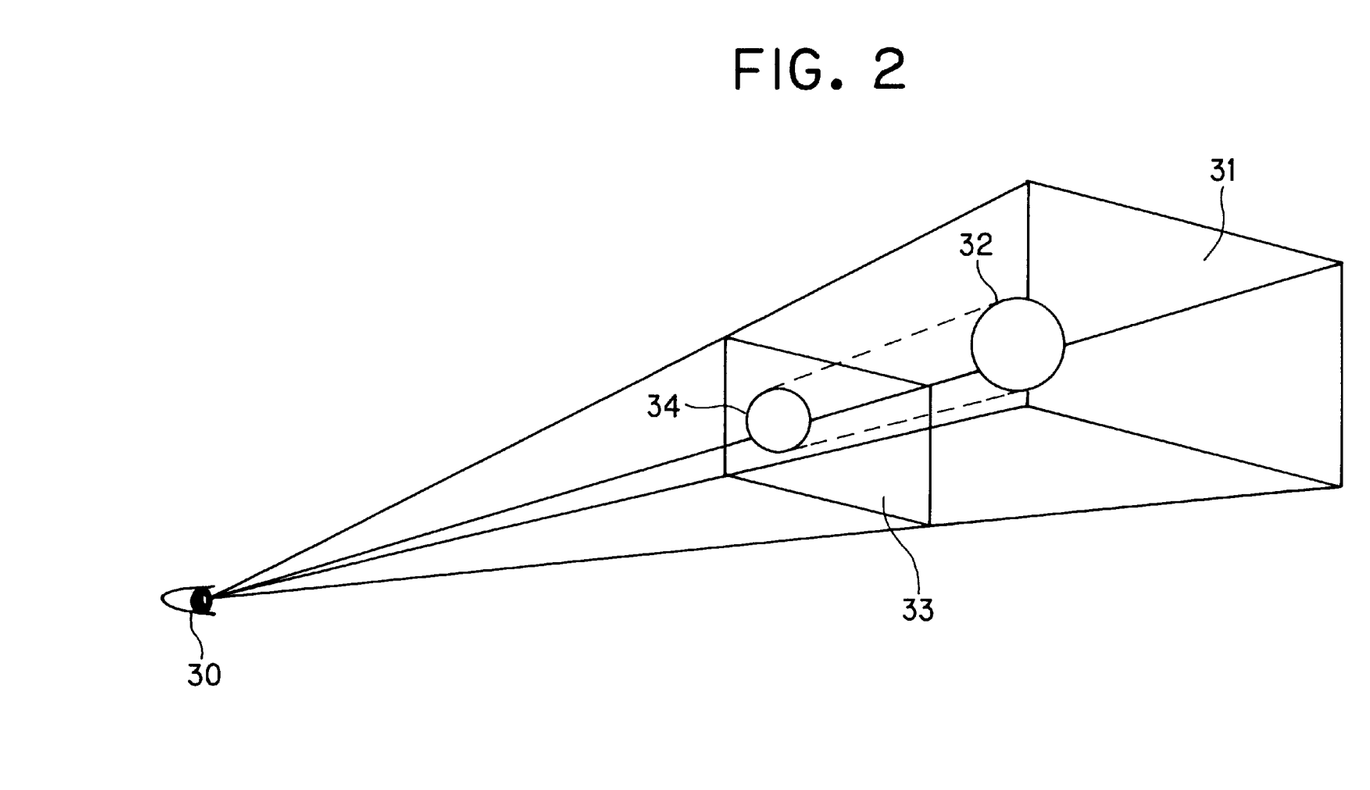
FIG. 2 is a diagram showing the relationship between a view image and a game picture in a game field.

FIG. 2 is a diagram showing the relationship between a view image and the game picture in a game field. In FIG. 2, a viewpoint 30 is defined at a predetermined coordinate in the virtual three-dimensional space. Then, a view area 31 corresponding to a predetermined view angle is defined when observing in a predetermined direction with the viewpoint 30 being as a reference. As shown in FIG. 2, an object to be displayed in the three-dimensional space is disposed on a predetermined position in the view area 31, and a projection object 34 is projected on a projection screen 33 based on a calculation result at the image calculation portion 23. The view point 30 and the object 32 changes their positions in the virtual three-dimensional space as time lapses, and in connection with these changes, a disposition or a size of the projection object 34 on the projection screen 33 is changed. The player would feel as if he or she actually observed the object 32 with standing on the viewpoint 30 through the observation of the image on the projection screen 33 in the game picture.

The object 32 shown in FIG. 2 is, for example, a character to be operated by the player, and an exterior of the character is subjected to the modeling using a lot of polygons. Incidentally, the number of objects disposed in the virtual three-dimensional is not restricted to one, but a plurality of objects including various structures can be disposed. Each polygon is defined by a plurality of vertex coordinates, and plural polygons are gathered to form the object 32. When forming the projection object 34 on the projection screen 33, it is possible to three-dimensionally display each object by subjecting the respective polygons to the coordinate transformation and then mapping a texture on each polygon.

In this embodiment, it is employed a method, as one of methods of displaying a game field, in which a three-dimensional configuration is represented with using a texture rendered thereon a two-dimensional pattern rather than using polygons, as well as a method of using polygons for the object. As described above, the load of image processing would excessively increase if all of three-dimensional configurations were represented by polygons. Therefore, a texture as a piece of picture representing one part of a three-dimensional configuration is additionally used. Hereinafter, the detail of the processing will be described.

Figure 3A:
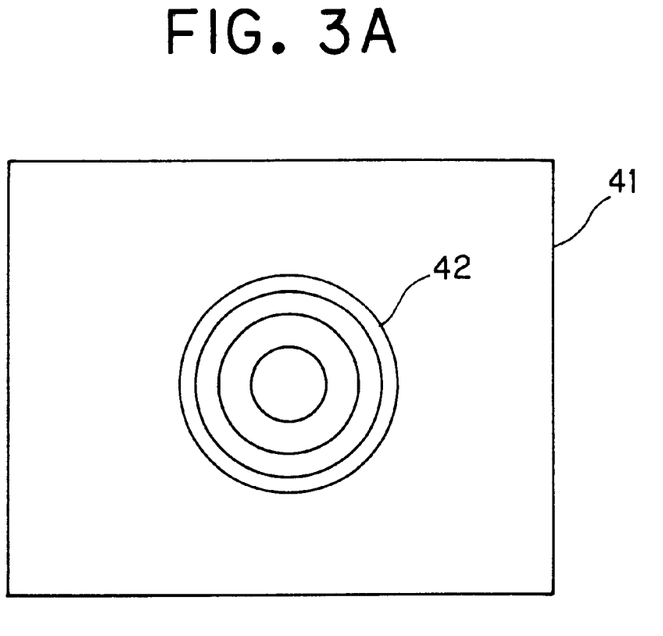
FIGS. 3A and 3B are views showing an object to be displayed in the first embodiment.
Figure 3B:
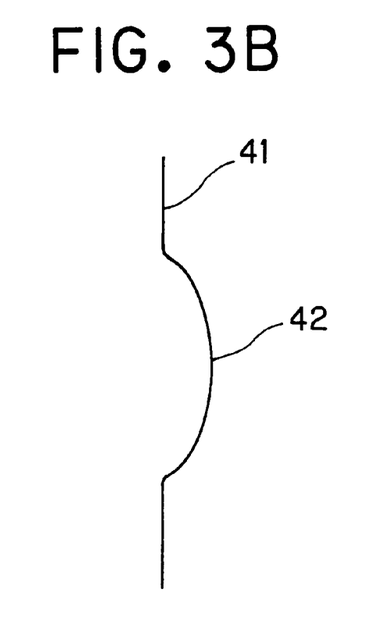

At first, the first embodiment of the present invention will be described with referring to FIGS. 3A to 6C. FIGS. 3A and 3B are views showing an object to be displayed in the first embodiment. In the first embodiment, as shown in FIGS. 3A and 3B, there is displayed the state in which a recess portion 42 such as a bullet mark is formed on a wall surface 41 of a structure such as a building in a game field. Such display is required, for example, in the case where a character to be operated has come across an enemy character, thereby entering a state of battle.

FIG. 3A is a front side view of the wall surface 41 of the structure. On the wall surface 41, there is formed the recess portion 42 having a concentrical appearance. Also, it can be understood from FIG. 3B showing a sectional view of FIG. 3A that the recess portion 42 formed on the wall surface 41 of the structure is in the dented condition. In the first embodiment, there is prepared a texture rendered thereon a two-dimensional pattern which can be recognized by observing the recess 42 from its front side, and the data of that texture is stored as texture information into the texture information storing portion 24a in advance.

Figure 4:
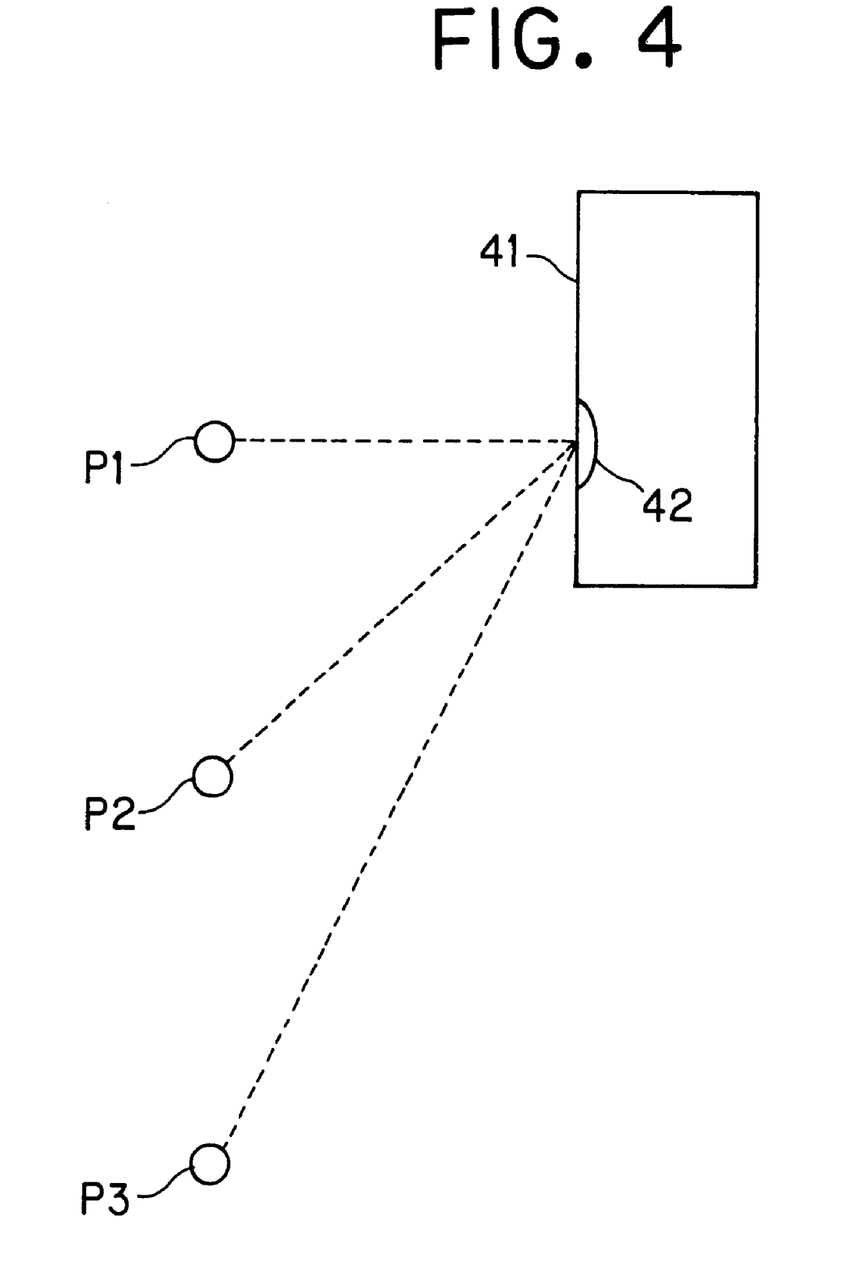
FIG. 4 is a diagram showing variation of a viewpoint in the case where a recess portion on a wall is observed.

Next, a method of producing a texture corresponding to the viewpoint in the first embodiment will be described with referring to FIGS. 4 to 5C. FIG. 4 is a diagram showing variation of a viewpoint in the case where a recess portion 42 on the wall surface 41 is observed, and FIGS. 5A to 5C are diagrams showing a method of processing a texture of the recess portion 42 in response to the variation of the viewpoint indicated in FIG. 4.

In FIG. 4, there is described a dispositional relationship between each of viewpoints P1 to P3 arranged in the game field and the recess portion 42 formed on the wall surface 41. The viewpoint P1 is arranged to observe the recess portion 41 from the front side thereof, the viewpoint P2 is arranged to observe the recess portion 41 from an oblique angle, and the viewpoint P3 is arranged to observe the recess portion 42 from a further oblique angle, respectively. Incidentally, in FIG. 4, only the deviation of the viewpoints P1 to P3 in a horizontal plane are considered, but the deviation of viewpoints in a vertical plane may be considered in the same manner.

Figure 5A:
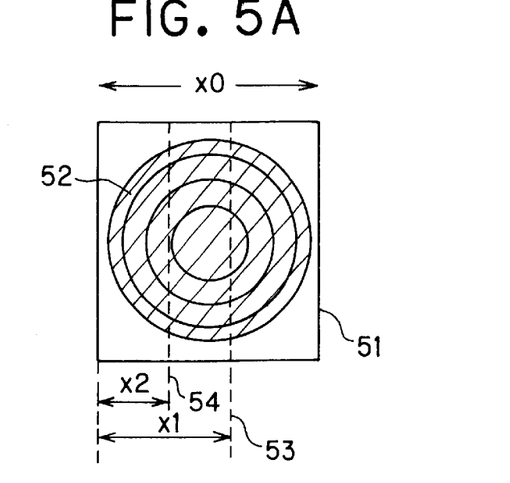
FIGS. 5A to 5C are diagrams showing a method of processing a texture of a recess portion in response to the variation of the viewpoint indicated in FIG. 4.

In FIG. 5A, there is described a texture 51 representing a two-dimensional pattern of the recess portion 42 viewed from its front side. This texture 51 is a texture treated as a basis in the first embodiment, and texture information corresponding to this texture 51 is stored in the texture information storing portion 24a in advance. The texture information corresponding to the texture 51 consists of pixel data in an image area having certain sizes in both of a x-direction and a y-direction. As will be described later, an extraction position is defined by regarding the size x0 of the texture 51 shown in FIG. 5A in the x-direction as a standard when extracting a texture.

A diagonally hatched area in FIG. 5A represents a mask pattern 52 that is set to accord with a circumferential configuration of the recess 42 of the texture 51. Namely, there is prepared data of a mask provided with a round opening in the area of the mask pattern 52, and that mask is disposed on the texture to thereby prevent the area which is not superposed by the mask pattern 52 from being displayed. Accordingly, when displaying a game picture, if the texture 52 is mapped on a predetermined mapping position, there can be obtained the state in which the recess portion 42 only corresponding to the mask pattern 52 is displayed, and an unnecessary portion is not displayed by performing the processing described later.

Figure 5B:
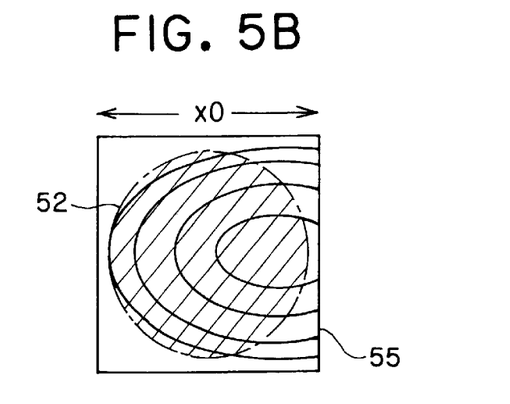

Also, a processed texture 55 shown in FIG. 5B is a texture corresponding to a pattern of the recess portion 42 when it is observed from the viewpoint P2, and the texture can be produced by performing the processing to the texture 51. To produce the texture 55, as shown in FIG. 5A, at first it is determined a size x1 providing an extraction position in the x-direction of the texture 51 and is defined an extraction area on the left side from the extraction position in the texture 51. The size x1 can be set to an appropriate value in accordance with an oblique angle of the wall surface 41 when it is observed from the viewpoint P2. Then, expanding processing is carried out to the extracted area to thereby change the size in the x-direction from x1 to x0 which is the same as that of the texture 51. Thus, there is obtained the processed texture 55 having the same size as that of the texture 51, but differs in a pattern of the recess portion 42.

And then, as shown in FIG. 5B with using diagonal lines, the mask pattern 52 having the same configuration and disposition as those for the texture 51 is used with respect to the processed texture 55. Namely, an area according to the mask pattern 52 of the recess portion 42 is displayed in the game picture with being subjected to the modification accompanying the after-mentioned mapping processing. On the other hand, a dead space in the recess portion 42 can be eliminated from the game picture when the portion 42 is viewed from the viewpoint P2.

Figure 5C:
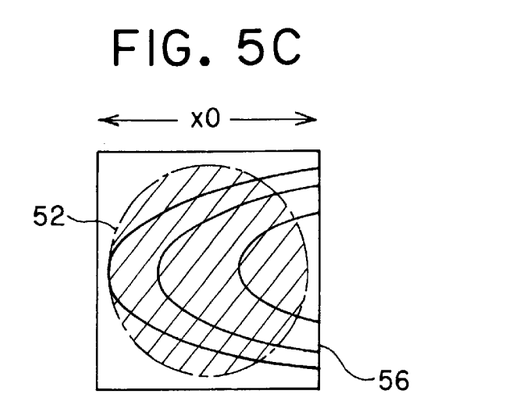

Also, a processed texture 56 shown in FIG. 5C is a texture corresponding to a pattern of the recess portion 42 when it is observed from the viewpoint P3, and can be produced through the same processing as that for the processed texture 55. In the case of the processed texture 56, since the oblique angle of the wall surface 41 from the viewpoint P3 increases in comparison with the observation from the viewpoint P2, a size x2 is set to a value less than x1 to thereby shift the extraction position leftward. Then, as shown in FIG. 5A, a left-side area from the extraction position given by the size x2 is extracted, and the expanding processing is carried out to change the size in the x-direction to x0 as described above, thereby obtaining the processed texture 56.

In the case shown in FIG. 5C, the mask pattern 52 having the same configuration and position as those of the texture 51 is used for the processed texture 56. Therefore, an area according to the mask pattern 52 of the recess portion 42 is displayed on the game picture, while a dead space in the recess portion 42 can be eliminated from the game picture when the portion 42 is viewed from the viewpoint P3.

Figure 6A:
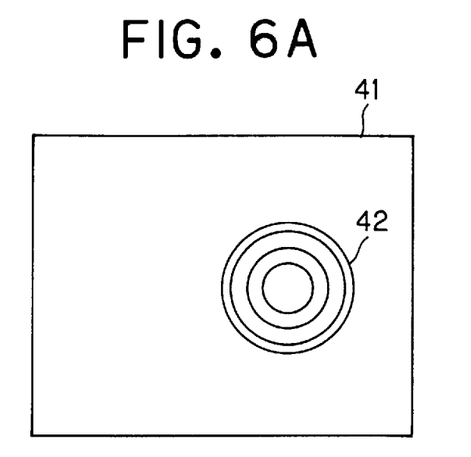
FIGS. 6A to 6C are diagrams showing the state of the variation of a picture representing the recess portion formed on a wall surface.
Figure 6B:
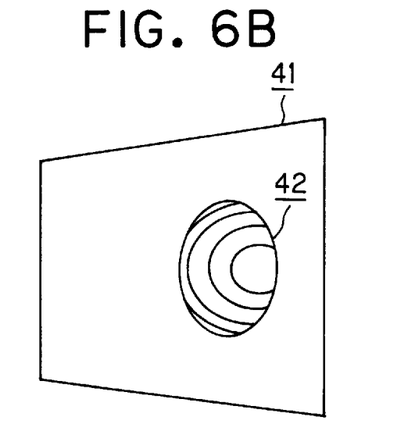
Figure 6C:
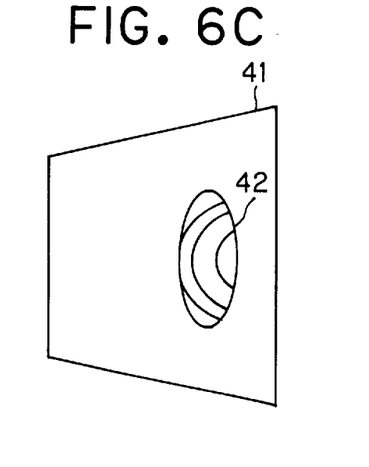

Next, processing carried out in the case where the texture 51 and the processed textures 55 and 56 are displayed in the game picture will be described with referring to FIGS. 6A to 6C. FIGS. 6A to 6C show variation of an image representing the recess portion 42 formed on a wall surface 41 in the game picture according to changes of the viewpoint as shown in FIGS. 4A to 4C. FIG. 6A shows an image viewed from the viewpoint P1, FIG. 6B shows an image viewed from the viewpoint, and FIG. 6C shows an image viewed from the viewpoint P3, respectively. In FIGS. 6A to 6C, mapping positions of the texture 51 and the processed textures 55 and 56 can be obtained by calculating coordinates in the projection screen 33 shown in FIG. 2 based on the disposition in the virtual three-dimensional space. Next, a position on which the polygon of the recess portion 42 is to be disposed is determined in such a manner that the polygon of the recess portion 42 abuts against a polygon representing the wall surface 41, the position of the polygon of the recess portion 42 is determined as a mapping position, and then the mapping processing of the texture 51 and the processed textures 55 and 56 are carried out. Therefore, as shown in FIGS. 6A to 6C, the recess 42 formed on the wall surface 41 is displayed in accordance with the viewpoint. As also shown in FIGS. 6A to 6C, it can be observed that the configuration of the recess portion 42 changes between a round shape and an oval shape depending on the oblique angle of the wall surface 41.

As described above, it is possible to perform a pseudo-three-dimensional display by processing a basic texture prepared in advance as one piece of picture according to the above described manner. Namely, it is possible to perform display corresponding to the oblique angle of the wall surface 41 in accordance with an arbitrary viewpoint. Also, in the case of FIGS. 6A to 6C, the recess portion 42 is partially in a dead space on the side adjacent to the viewpoint P2 or P3, so that the dead space portion is eliminated from the view. Therefore, it is possible to exactly represent real solidity when the player virtually moves in the game field.

Figure 7A:
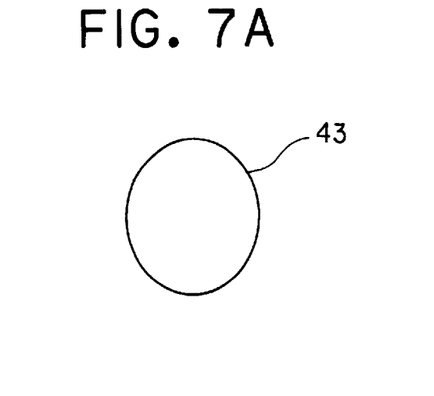
FIGS. 7A and 7B are diagrams showing an object to be displayed in the second embodiment.
Figure 7B:
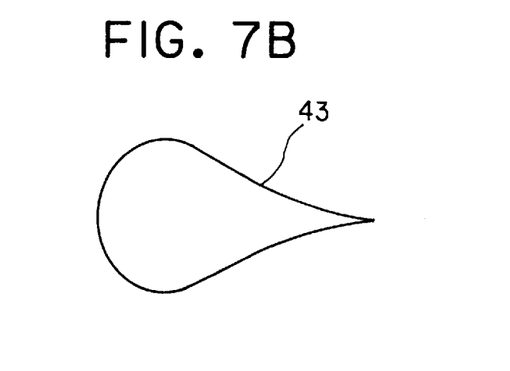

Next, the second embodiment according to the present invention will be described with referring to FIGS. 7A to 9D. FIGS. 7A and 7B are diagrams showing an object to be displayed in the second embodiment. As shown in FIGS. 7A and 7B, a fireball object 43 in the game field is treated as an object to be displayed in the second embodiment. Such display is required, for example, in the case where a character to be operated discharges a beam configured in a fireball shape as means for attacking.

FIG. 7A is a front view of the fireball object 43, and a circumferential configuration thereof is formed in a round shape. Also, FIG. 7B is a side view of the fireball object 43, and a circumferential configuration thereof is formed in a shape in which a tail is extended from a spherical head. This represents the state that the fireball object 43 is partially and backwardly drifted when it moves toward the left side in FIG. 7B. In the second embodiment, two textures with two-dimensional patterns are prepared with respect to the head and tail of the fireball object 43 for using the basis of after-mentioned processing.

Figure 8:
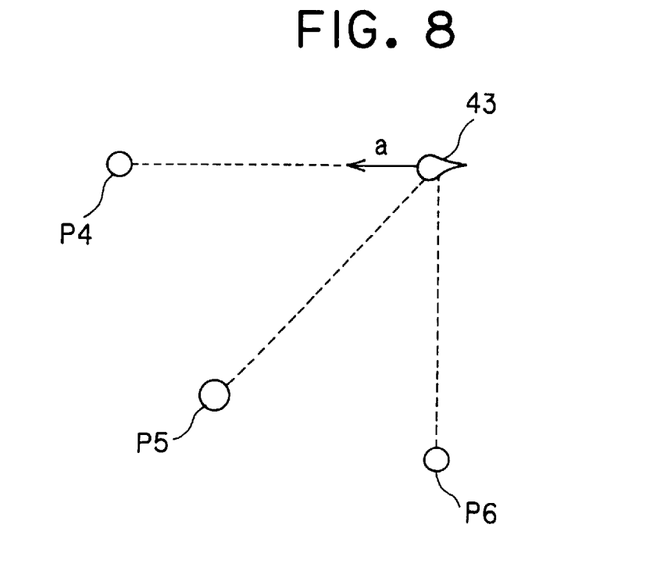
FIG. 8 is a diagram showing variation of a viewpoint in the case where a fireball object is observed.

Next, a method of producing a texture corresponding to the viewpoint in the second embodiment will be described with referring to FIGS. 7 to 9D. FIG. 8 is a diagram showing variation of a viewpoint in the case where the fireball object 43 is observed, and FIGS. 9A to 9D are diagrams showing a method of processing and joining two textures of the fireball object 43 in response to the variation of the viewpoint described in FIG. 8.

In FIG. 8, there is described a dispositional relationship between each of three viewpoints P4 to P6 defined in the game field and the fireball object 43. The viewpoint P4 is arranged to observe the fireball object 43 moving toward a side indicated by an arrow a from its front side, the viewpoint P5 is arranged to observe it from an oblique angle, and the viewpoint P6 is arranged to observe it from the side thereof. In FIG. 8, the variation of the viewpoint in the horizontal plane in the game field is considered.

Figure 9A:
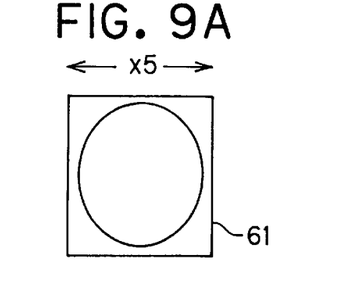
FIGS. 9A to 9D are diagrams showing a method of processing and joining two textures of the fireball object in response to the variation of the viewpoint described in FIG. 8.
Figure 9B:
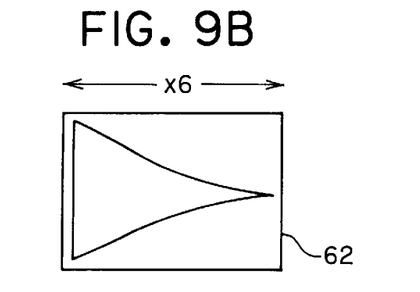

A texture 61 shown in FIG. 9A and a texture 62 shown in FIG. 9B are basic textures in the second embodiment, and texture information corresponding thereto is stored in the texture information storing portion 24a in advance. The texture information corresponding to each of the respective texture 61 and texture 62 consists of pixel data in an image area having a certain size, and the size of the texture 61 in the x-direction is set to x5, while the size of the texture 62 in the same direction is set to x6. The texture 61 is a texture representing a two-dimensional pattern of the fireball object 43 viewed from the viewpoint P4.

Figure 9C:
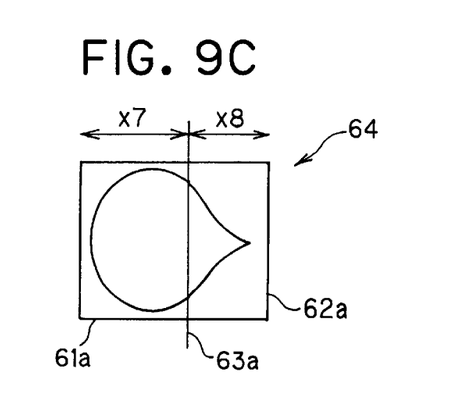

A texture 64 shown in FIG. 9C is a texture corresponding to the fireball object 43 viewed from the viewpoint P5, and is produced by joining the texture 61 and the texture 62 after processing them. A processed texture 61a composing the joined texture 64 is produced from the texture 61 by extracting a left-side area thereof from an extraction position given by a size of x7. Also, a processed texture 62a is a texture obtained by deforming the texture 62 so as to decrease the size thereof in the x-direction from x6 to x8. Then, the joined texture 64 is produced by defining a joining position 63a so as to accord with the extraction position in FIG. 9C and joining the processed texture 61a and the processed texture 62a to each other.

Figure 9D:
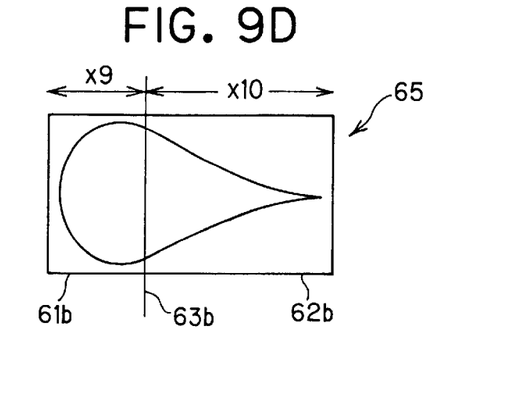

Also, a joined texture 65 shown in FIG. 9D is a texture corresponding to the fireball object 43 viewed from the viewpoint P6, and is produced through a method generally the same as that described in FIG. 9C. In the case of this joined texture 65, since the texture 65 has to represent the state that the fireball object 43 is viewed from its side, an extraction position is defined by decreasing the size x9 to shorten the processed texture 61a of the head while using the non-compressed texture 62 of the tail as the processed texture 62b with considering the size x6 as x10. Then, the joined texture 65 is produced by joining the processed texture 61b and the texture 62b at a joining position 63b.

When displaying the texture 61 and the joined textures 64 and 65 in the second embodiment, the mapping processing is carried out at a mapping position defined to be opposite to the viewpoint. In the second embodiment, it is possible to perform a pseudo-three-dimensional display with various expression by carrying out the texture processing and joining based on the two basic textures 61 and 62. In particular, the second embodiment is effective in the case where an object having a different external feature according to an observation direction such as a fireball object 43. Incidentally, the second embodiment is applicable to the case where the viewpoint is changed in the vertical plane, as well as in the case of changing the viewpoint in the horizontal plane. Also, in the above explanation, there is described the case of joining two textures, but it is allowed to increase the number of textures to be joined.

Figure 10A:
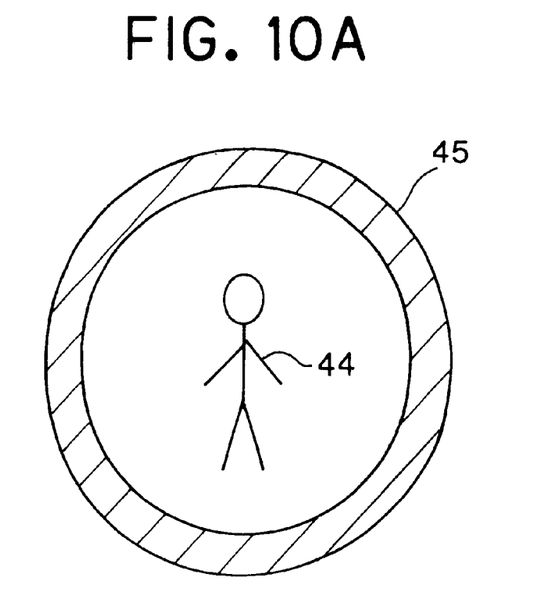
FIGS. 10A and 10B are diagrams showing an object to be displayed in the third embodiment.
Figure 10B:
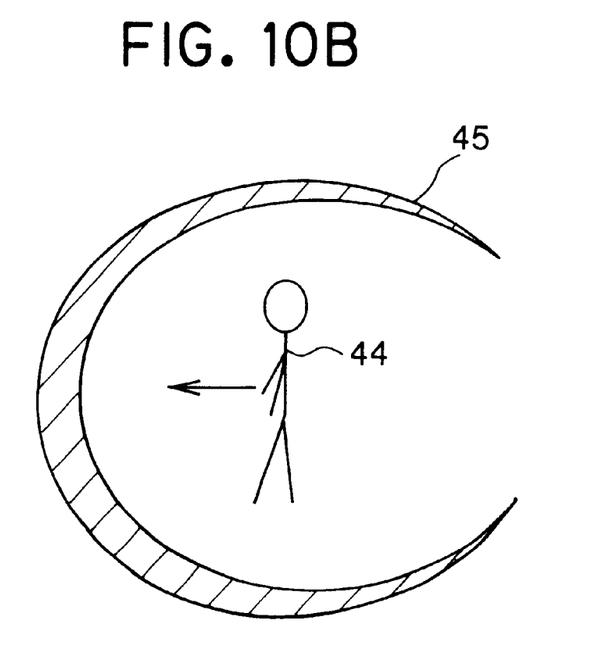

Next, the third embodiment of the present invention will be described with referring to FIGS. 10A to 12C. FIGS. 10A and 10B are diagrams showing an object to be displayed in the third embodiment. In the third embodiment, as shown in FIG. 10, a gaseous object 45 surrounding a specific character 44 in the game field is considered as an object to be displayed. Such display is required, for example, in the case where the character 44 subject to the operation by the player is surrounded with a gaseous shield.

FIG. 10A is a diagram showing the gaseous object 45 when it is viewed from the front side of the character 44, and in this figure, a density of the gaseous object 45 is represented with a circumference of the character 44 being deeply depicted. In FIG. 10A, an area where the transparency of the gaseous object 45 decreases is distributed symmetrically in all directions. On the other hand, FIG. 10B is a diagram showing the gaseous object 45 when it is viewed from the side of the character 44 moving toward a side indicated by an arrow. In the case of FIG. 10B, the transparency increases due to the diffusion of the gas at the back of the gaseous object 45. In the third embodiment, a texture rendered thereon this gaseous object 45 as a two-dimensional model is prepared and is used for the basis of the texture processing mentioned later.

Figure 11:
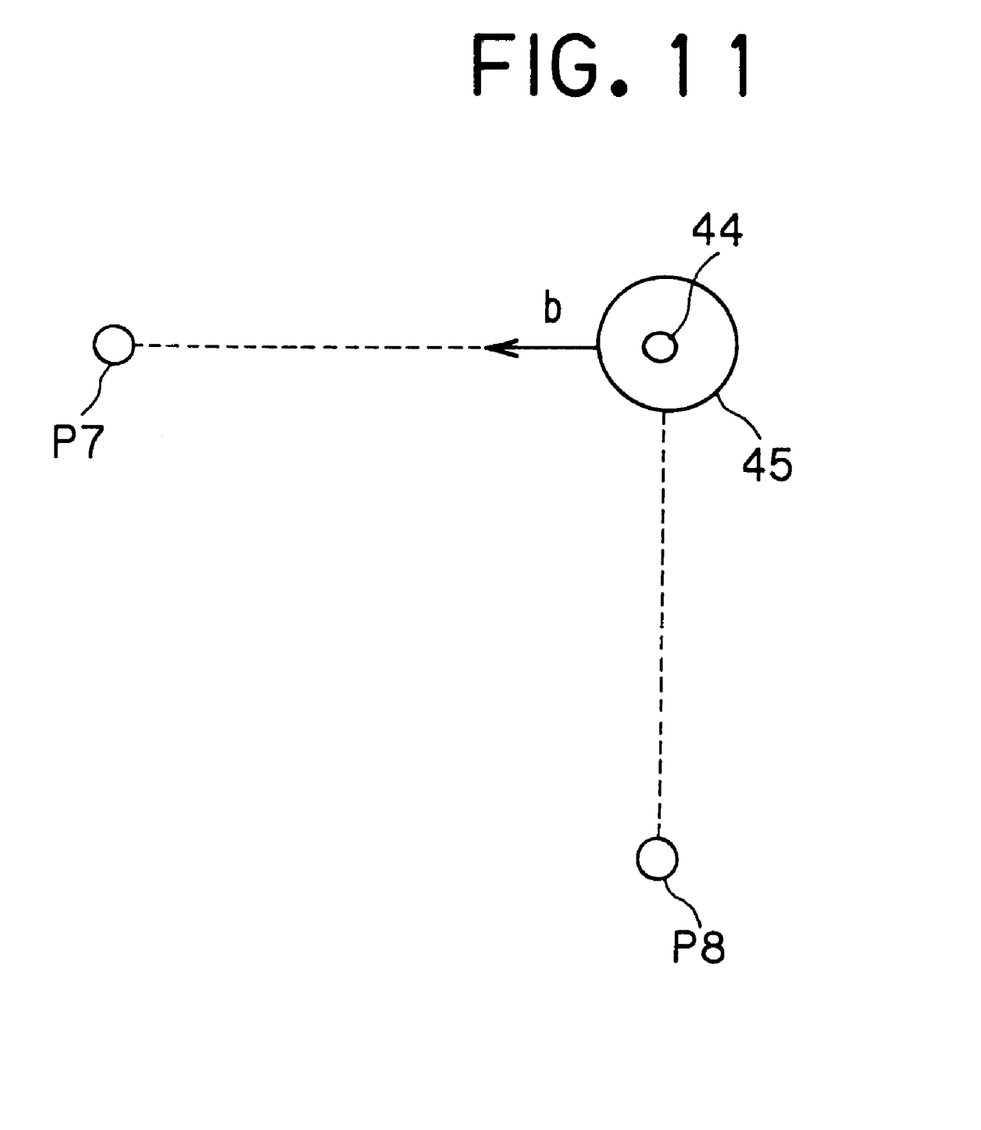
FIG. 11 is a diagram showing variation of a viewpoint in the case where a gaseous object is observed.

Next, a method of producing a texture corresponding to the viewpoint in the third embodiment will be described with referring to FIGS. 11 to 12C. FIG. 11 is a diagram showing variation of a viewpoint when the gaseous object 45 is observed, and FIGS. 12A to 12C are diagrams showing a method of processing and joining the texture of the gaseous object 45 in response to the variation of the viewpoint described in FIG. 11.

In FIG. 11, there is described a dispositional relationship between each of two viewpoints P7 and P8 defined in the game field and the gaseous object 45 surrounding the character 44. With respect to the character 44 and the gaseous object 45 moving toward the side indicated by an arrow b, the viewpoint P7 is arranged to observe them from the front side thereof, and the viewpoint P8 is arranged to observe them from the side thereof. In FIG. 11, the variation of the viewpoint in the horizontal plane in the game field is considered similar to the case of FIGS. 4 and 8.

Figure 12A:
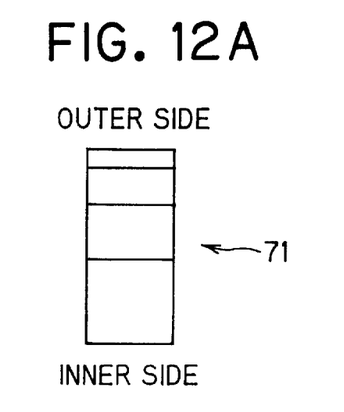
FIGS. 12A to 12C are diagrams showing a method of processing a texture of the gaseous object in response to the variation of the viewpoint described in FIG. 11.
Figure 12B:
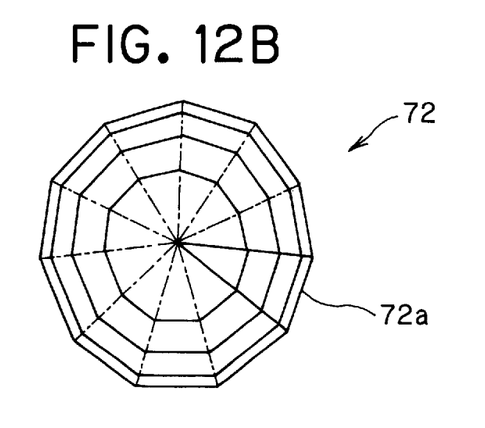
Figure 12C:
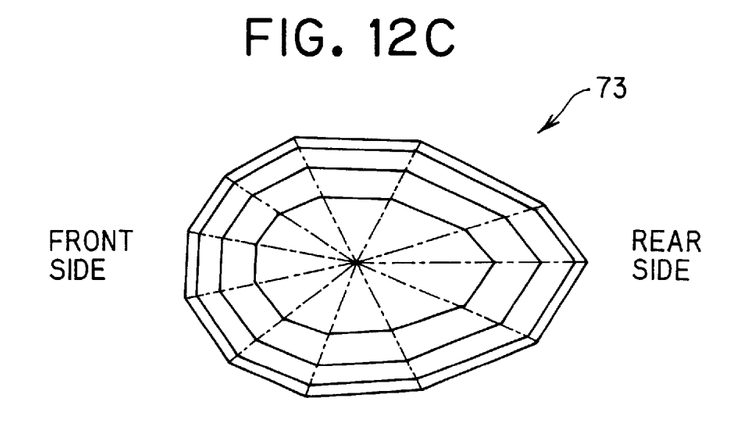

There is shown in FIG. 12A a basic texture 71 in the third embodiment, and texture information corresponding thereto is stored in the texture information storing portion 24a in advance. Also, there is shown in FIG. 12B a polygon model obtained by modeling the appearance of the gaseous object 45. In the third embodiment, the gaseous object 45 is represented by joining the textures 71 on the polygon model 72.

The polygon model 72 shown in FIG. 12A is an aggregation of polygons defined by a lot of vertex coordinates. On the other hand, the basic texture 71 is deformed and disposed on each triangular area 72a composing the polygon model 72, and a gradation pattern is rendered on each area 72a from the inner side to the outer side thereof. Also, texture information corresponding to the texture 71 includes an alpha value. This alpha value is a parameter defining the transparency for each image area of the texture 71. With respect to the texture shown in FIG. 12A, a predetermined transparency is set as an alpha value for each section of the triangular area 72a from the inner side to the outer side thereof.

Then, the texture 71 is deformed to be adapted to the vertex coordinates of the respective triangular areas 72a of the polygon model 72, so that the textures 71 is joined to each other. According to the texture 71 joined on the polygon model 72, the pattern and the transparency are distributed symmetrically about the center thereof, so that the gaseous object 45 observed from the viewpoint P7 can be represented.

On the other hand, a polygon model 73 has a configuration obtained by deforming the above-mentioned polygon model 72. Namely, as shown in FIG. 12C, the back side of the polygon model 73 has a configuration expanding outside in comparison with the front side thereof. This polygon model 73 represents a configuration of the gaseous object 45 to be observed from the viewpoint P8. A basic texture is deformed and disposed to be adapted to the vertex coordinates of the deformed polygon model 73, and an alpha value defined for the texture 71 is modified to increase the transparency at the rear side of the polygon model 73. Thus, the pattern and the transparency are distributed asymmetrically, so that the gaseous object 45 observed from the viewpoint P8 can be represented.

When displaying the textures 71 joined on the polygon model 72 and 73 in the third embodiment in the game picture, the mapping processing is carried out at a mapping position defined to be opposite to the viewpoint. In the third embodiment, the transparency can be changed in accordance with the viewpoint as well as the disposition of the basic texture 71, so that pseudo-three-dimensional display with special representation can be performed. Incidentally, the third embodiment is applicable to the case where the viewpoint is changed in the vertical plane, as well as in the case of changing the viewpoint in the horizontal plane.

In the first, second and third embodiments, the number of viewpoints are set to two or three for convenience of the explanation, but the above described image processing corresponding to a lot of viewpoints can actually be performed. Therefore, it is possible to display in the game picture the state in which the pattern of the texture generally continuously changes in response to the movement of the viewpoint in the game field.

The present invention is not limited to the aforementioned embodiments, but can be applied to the display object having various configurations. Also, the present invention can be applied to the all image display systems for the virtual three-dimensional space besides the game system. As the game system embodying the present invention, it can be employed a business game apparatus, a family-use game apparatus, an online-game system via the internet, or the like. Also, the storage medium storing the game program for implementing the game system according to the present invention, it can be used various storage medium, such as CD-ROM, floppy disk, hard-disk or the like, besides the DVD-ROM.

As is described above, in the game system according to the present invention, a three-dimensional configuration is represented on a texture, and that texture is processed and mapped for display in the game picture a game field constructed in a virtual three-dimensional space. Therefore, it is possible to display for the player a real and high quality three-dimensional image in the game picture without excessively increasing the load of the image processing.

What is claimed is:

1. A game system in which a game field is configured in a virtual three-dimensional space and a display image of said game field visible from a predetermined viewpoint is formed to thereby be displayed as a game picture, comprising:

a texture storing device for storing in advance a texture rendering a pattern thereon to be recognized by observing a recess portion from a front side thereof;

a mapping surface setting device for setting a mapping surface of the texture in the game field;

a texture processing device for determining an area to be treated as a dead space in the texture depending on an oblique angle of the mapping surface observed from the viewpoint, defining an extraction position to extract a part from the texture depending on the oblique angle so as to eliminate the area to be treated as the dead space from the texture, extracting the part from the texture readout from the texture storing device in accordance with the extraction position, and processing the extracted part so as to be expanded along one linear direction such that said extracted part is stretched to an original size of the texture in the one linear direction;

a mask pattern disposal device for disposing a mask pattern set on the texture after processed to accord with a circumferential configuration of the recess portion of the texture before processed; and a texture mapping device for modifying an area of the processed texture matching with the mask pattern so as to change a shape of the recess portion to be visible depending on the oblique angle of the mapping surface observed from the viewpoint, and mapping the area to the mapping surface.

2. The game system according to claim 1, wherein the texture processing device defines the extraction position as a line shifting on the texture in connection with the oblique angle.

3. A game system in which a game field is configured in a virtual three-dimensional space and a display image of said game field visible from a predetermined viewpoint is formed to thereby be displayed as a game picture, comprising:

a texture storing device for storing in advance a plurality of textures, on each of which a head portion or a tail portion with respect to a moving direction of a fireball object to be displayed is represented as a two-dimensional pattern;

a mapping surface setting device for setting a mapping surface of the texture to be opposite to the viewpoint in the game field;

a texture processing device for, in accordance with a dispositional relationship between the viewpoint and the fireball object, after setting an extraction position with respect to the moving direction on the texture of the head portion, processing the texture of the head portion so as to extract a part of the texture of the head portion, the part being more forward in the moving direction than the extraction position, and processing the tail portion of the texture so as to decrease a size thereof in the moving direction in accordance with the dispositional relationship;

a texture joining device for joining the processed textures to each other at a joint position according with the extraction; and a texture mapping device for mapping the joined textures on the mapping surface.

4. A game system in which a game field is configured in a virtual three-dimensional space and a display image of a gaseous object around a specified character in said game field visible from a predetermined viewpoint is formed to thereby be displayed as a game picture, comprising:

a texture storing device for storing in advance a plurality of textures, a mapping surface setting device for setting a mapping surface of each of the textures to be opposite to the viewpoint in the game field;

a texture processing device for disposing each of the textures to each of triangular areas composing a polygon model representing the gaseous object with deformation to adapt to each vertex coordinate of the triangular areas to join each of the textures on the polygon model;

a texture mapping device for mapping the joined textures on the mapping surface, wherein on each of the textures a gradation pattern is rendered from an inner side to an outer side of each of the triangular areas, and a predetermined transparency is set for each of the triangular areas from the inner side to the outer side of each of the triangular areas, wherein the texture processing device deforms the polygon model, according to a dispositional relationship between the viewpoint and a moving direction of the character, to make a rear side of the polygon model in the moving direction expanded outside in comparison with a front side of the polygon model and modifies the transparency of each of the textures, according to the dispositional relationship between the viewpoint and the moving direction of the character, to be increased gradually form the front side to the rear side.

5. A computer readable storage medium storing a game program for allowing a computer included in a game system in which system in which a game field is configured in a virtual three-dimensional space and a display image of said game field visible from a predetermined viewpoint is formed to thereby sbe displayed as a game picture, to serve as:

a texture storing device for storing in advance a texture rendering a pattern thereon to be recognized by observing a recess portion from a front side thereof;

a mapping surface setting device for setting a mapping surface of the texture in the game field;

a texture processing device for determining an area to be treated as a dead space in the texture depending on an oblique angle of the mapping surface observed from the viewpoint, defining an extraction position to extract a part from the texture depending on the oblique angle so as to eliminate the area to be treated as the dead space from the texture, extracting the part from the texture readout from the texture storing device in accordance with the extraction position, and processing the extracted part so as to be expanded along one linear direction such that said extracted part is stretched to an original size of the texture in the one linear direction;

a mask pattern disposal device for disposing a mask pattern set on the texture after processed to accord with a circumferential configuration of the recess portion of the texture before processed; and a texture mapping device for modifying an area of the processed texture matching with the mask pattern so as to change a shape of the recess portion to be visible depending on the oblique angle of the mapping surface observed from the viewpoint, and mapping the area to the mapping surface.

6. The computer readable storage medium according to claim 5, wherein the texture processing device defines the extraction position as a line shifting on the texture in connection with the oblique angle.

7. A computer readable storage medium storing a game program for allowing a computer included in a game system in which system in which a game field is configured in a virtual three-dimensional space and a display image of said game field visible from a predetermined viewpoint is formed to thereby be displayed as a game picture, to serve as:

a texture storing device for storing in advance a plurality of textures, on each of which a head portion or a tail portion with respect to a moving direction of a fireball object to be displayed is represented as a two-dimensional pattern;

a mapping surface setting device for setting a mapping surface of the texture to be opposite to the viewpoint in the game field;

a texture processing device for, in accordance with a dispositional relationship between the viewpoint and the fireball object, after setting an extraction position with respect to the moving direction on the texture of the head portion, processing the texture of the head portion so as to extract a part of the texture of the head portion, the part being more forward in the moving direction than the extraction position, and processing the tail portion of the texture so as to decrease a size thereof in the moving direction in accordance with the dispositional relationship;

a texture joining device for joining the processed textures to each other at a joint position according with the extraction position; and a texture mapping device for mapping the joined textures on the mapping surface.

8. A computer readable storage medium storing a game program for allowing a computer in a game system in which a game field is configured in a virtual three-dimensional space and a display image of a gaseous object around a specified character in said game field visible from a predetermined viewpoint is formed to thereby be displayed as a game picture, to serve as:

a texture storing device for storing in advance a plurality of textures, a mapping surface setting device for setting a mapping surface of each of the textures to be opposite to the viewpoint in the game field;

a texture processing device for disposing each of the textures to each of triangular areas composing a polygon model representing the gaseous object with deformation to adapt to each vertex coordinate of the triangular areas to join each of the textures on the polygon model;

a texture mapping device for mapping the joined textures on the mapping surface, wherein on each of the textures a gradation pattern is rendered from an inner side to an outer side of each of the triangular areas, and a predetermined transparency is set for each of the triangular areas from the inner side to the outer side of each of the triangular areas, wherein the texture processing device deforms the polygon model, according to a dispositional relationship between the viewpoint and a moving direction of the character, to make a rear side of the polygon model in the moving direction expanded outside in comparison with a front side of the polygon model and modifies the transparency of each of the textures according to the dispositional relationship between the viewpoint and the moving direction of the character, to be increased gradually form the front side to the rear side.

* * * * *